United States Patent
Francis et al.

(10) Patent No.: US 7,190,668 B1
(45) Date of Patent: Mar. 13, 2007

(54) METHOD OF ANCHORING FLOWS

(75) Inventors: Paul Francis, San Mateo, CA (US); Pablo Rodriguez Rodriguez, Menlo Park, CA (US)

(73) Assignee: Nokia Corporation, Espoo (FI)

( * ) Notice: Subject to any disclaimer, the term of this patent is extended or adjusted under 35 U.S.C. 154(b) by 954 days.

(21) Appl. No.: 09/996,479

(22) Filed: Nov. 27, 2001

(51) Int. Cl.
*G06F 11/00* (2006.01)
*H04L 12/28* (2006.01)

(52) U.S. Cl. ............... 370/229; 370/392; 370/401; 370/469

(58) Field of Classification Search .......... 370/242, 370/229, 349, 392, 328, 331, 351, 400, 401, 370/469, 389
See application file for complete search history.

(56) References Cited

U.S. PATENT DOCUMENTS

| | | | |
|---|---|---|---|
| 5,325,362 A | 6/1994 | Aziz | |
| 5,442,633 A | 8/1995 | Perkins et al. | |
| 5,825,759 A | 10/1998 | Liu | |
| 6,160,804 A * | 12/2000 | Ahmed et al. | 370/349 |
| 6,161,008 A | 12/2000 | Lee et al. | |
| 6,230,012 B1 | 5/2001 | Willkie et al. | |
| 6,256,300 B1 | 7/2001 | Ahmed et al. | |
| 6,822,955 B1 * | 11/2004 | Brothers et al. | 370/389 |

OTHER PUBLICATIONS

Perkins, C., "IP Mobility Support", RFC 2002, Oct. 1996.
Montenegro, G., "Reverse Tunneling for Mobile IP", RFC 2344, May 1998.
Johnson, D., Perkins, C., "Mobility Support in IPv6", IETF draft-ietf-mobileip-ipv6-14.txt, Jul. 2001.
Soliman, H., et. al., "Hierarchical MIPv6 mobility management (HMIPv6)", IETF draft-ietf-mobileip-hmipv6-04.txt, Jul. 2001.
3GPP, "GPRS Service Description Rel. 1999", 3GPP TS 23.060.
Kempf, J. et. al., "Bidirectional Edge Tunnel Handover for IPv6", IETF draft-kempf-beth-ipv6-02.txt, Mar. 2002.
Soliman, H., et. al., "Per-flow movement in MIPv6", IETF draft-soliman-mobileip-flow-move-00.txt, Jul. 2001.
Zhao, X., et. al., "Flexible network Support for Mobile Hosts", ACM MONET, 2001.
Lin, Y., et. al., "Wireless and Mobile Network Architectures", Wiley Computer Publishing, ISBN 0-471-39492-0, 2001.
Srisuresh, P., et. al., "Traditional IP Network Address Translator (Traditional NAT)", RFC 3022, Jan. 2001.
Tsirtsis, G., Srisuresh, P., "Network Address Translation—Protocol Translation (NAT-PT)", RFC 2766, Feb. 2000.
Stevens, W., "TCP/IP Illustrated, vol. 1", Addison-Wesley, ISBN 0-201-63346-9, 1994.
Dommety, G., "Key and Sequence Number Extensions to GRE", RFC 2890, Sep. 2000.
Malki, K., et al., "Low Latency Handoff in Mobile IPv4", IETF draft-ietf-mobileip-lowlatency-handoffs-v4-01.txt, May 2001.

* cited by examiner

*Primary Examiner*—Afsar Qureshi
(74) *Attorney, Agent, or Firm*—Squire, Sanders & Dempsey, L.L.P.

(57) ABSTRACT

A method is described for anchoring IP flows in a network. An IP flow is transmitted by a mobile node and received at a access router attached to the mobile node. The IP flow is transferred to an original access router, which maintains a host table associated with the mobile node. And a server that is attached to the original access router may be accessed to service the IP flow.

49 Claims, 14 Drawing Sheets oAR Flow Table

| MN | CN | oAR | nAR |
|----|----|-----|-----|
| M  | C  | self | nA |

161 nAR Flow Table

| MN | CN | oAR | nAR |
|----|----|-----|-----|
| M  | C  | oA  | self |
| M  | C  | self |     |

162 oAR Flow Table

| MN | CN | oAR | nAR |
|----|----|-----|-----|
| M  | C  | self | cA |

163 nAR Flow Table

| MN | CN | oAR | nAR |
|----|----|-----|-----|
| M  | C  | self | cA |

164 cAR Flow Table

| MN | CN | oAR | nAR |
|----|----|-----|-----|
| M  | C  | oA  | self |
| M  | C  | nA  | self |

METHOD OF ANCHORING FLOWS

FIELD OF THE INVENTION

This invention relates to the field of networks and, in particular, to networks having mobile nodes.

BACKGROUND

Although the Internet offers services worldwide, these services may be accessed at some fixed location, i.e. home, office, school. With relocation from one of these locations to another, the applications and services that were initiated previously have to be re-initiated again. With the emerging popularity of notebooks, handhelds and other portable computing devices this limitation affects the flexibility of accessing the information superhighway.

The mobile Internet Protocol (IP) development promises to substitute the dependence on fixed points of Internet attachment with the flexibility of mobility. In a mobile networking, computing activities are not disrupted when the user changes his/her computer's point of attachment to the Internet. Instead, all the required reconnections occurs automatically and noninteractively.

One of the challenges of the mobile IP is to ensure that none of the activities initiated by the user are lost once the user changes its point of connection. When the user changes its point of connection, all the new operations and activities start to flow through the new point of attachment, through the new access router. The packets can no longer be diverted through a server that is attached to the original access router, which contains all the necessary information in maintaining all the operations that the user initiated prior to changing his/her location. As a result, the services that were in progress are prematurely terminated upon the user's change of a point of attachment.

In IP networks (mobile or not), it is common for services, such as web caching, to be deployed at access routers. Many servers, such as web caches, have two important properties. First, they are stateful. That is, they maintain information (state) about the service they are providing during the duration of a flow (for example, a TCP connection). Packets for a given flow cannot start going to a different server, because that server will not have the state required to continue providing the service. Second, the servers are transparent to the mobile node. That is, the mobile node does not know that its packets are passing through the server, and cannot intentionally direct packets to the server. Instead, the access router diverts packets to the server transparently to the mobile node.

The combination of stateful transparent servers and mobility across access routers creates a problem that is not solved by current mobile IP technology. When a mobile node changes access routers, and its flows stop going through the old access router and start going through the new access router, the packets can no longer be diverted by the old access router to the server that contains state about one or more flows, because the old access router no longer receives the packets. As a result, any services that were in progress will fail.

The most common way to deal with services in mobile IP is to provide the service not at the access router, but at some other "anchor router" that all packets traverse. For instance, RFC 2002, which applies to IPv4, requires that packets traverse a router called the Home Agent. If reverse tunneling is used, as specified in RFC 2344, then packets in both directions will traverse the Home Agent, and stateful transparent services can be attached there. IPv6 mobility, described in "Mobility Support in IPv6" by David Johnson and Charles Perkins, also uses a Home Agent, though in IPv6 its use is optional. Alternatively, hierarchical mobility in IPv6, description of which may be found in "Hierarchical MIPv6 mobility management (HMIPv6)" written by Hesham Soliman and Karim El-Malki, causes packets to go through a mobile anchor point, as long as the mobile node stays within a certain region. The 3GPP mobility architecture handles device mobility at a layer below IP, and requires that all packets for a given flow pass through an IP router called the GGSN (3GPP TS 23.060). In all of these architectures, the anchor router (the Home Agent, mobile anchor point, or GGSN) may be far from the mobile node. Because services like web caching perform better while located closer to the mobile node, these architectures limit the performance of transparent stateful services.

"Bidirectional Edge Tunnel Handover for IPv6" written by James Kempf, et al., teaches that all flows from a mobile node may be routed through the old access router. It does not, however, distinguish between different flows. Therefore, new flows must also go through the old access router. Once the mobile node obtains an address from the new access router, all flows stop traversing the old access router, whether they originated there or not. The publication makes no mention of services.

"Per-flow movement in MIPv6" by Soliman, et al., and "Flexible Network Support for Mobile Hosts" by X. Zhao teach that individual flows from a mobile node may be treated differently (for IPv6 and IPv4 respectively). These works only consider a case where a mobile node has multiple access routers (possibly through different types of access technology), and is able to direct flows individually through the different access routers.

The TIA IS-41 wireless mobility standard, described in chapter 6 of "Wireless and Mobile Network Architectures", teaches that voice circuits are anchored at the Mobile Switching Center (MSC) where the circuit was initially established. However, IS-41 applies to voice circuits and not IP flows. Moreover, IS-41 mobile nodes deal with only a single flow at a time—the voice circuit.

Some U.S. Patents, more specifically, U.S. Pat. No. 5,325,362; No. 5,442,633; and No. 6,161,008, teach various means of updating IP addresses and routes from old to new access routers. None of them, however, consider the issue of transparent stateful services deployed at the access routers.

In U.S. Pat. No. 5,442,633, Liu teaches that services can be transferred from a mobile node'old access router to its new access router, either before or after the mobile node switches routers. This imposes the burden of transferring the service state, which may be substantial and, in many existing servers, not possible.

U.S. Pat. No. 6,160,804 and No. 6,256,300 teach the use of an anchor router as a way of hiding mobility from the remote node with which the mobile node is communicating. As with other anchor router schemes, this limits the performance of services that need to be located near the mobile node.

SUMMARY OF THE INVENTION

The present invention pertains to a method of anchoring IP flows. In one embodiment, the method may comprise receiving an IP flow of a plurality of IP flows from a mobile node at an attached access router and transferring the IP flow to an original access router. The original router may maintain a host table associated with the mobile node. The method may also comprise accessing a server attached to the original access router to service the IP flow.

Additional advantages of the present invention will be apparent from accompanying drawings and from the detailed description that follows.

BRIEF DESCRIPTION OF THE DRAWINGS

The features and advantages of the invention will be understood by reading the following description in conjunction with the drawings, where:

FIG. 13 illustrates exemplary anchor flow tables.

DETAILED DESCRIPTION

Figure 1A:
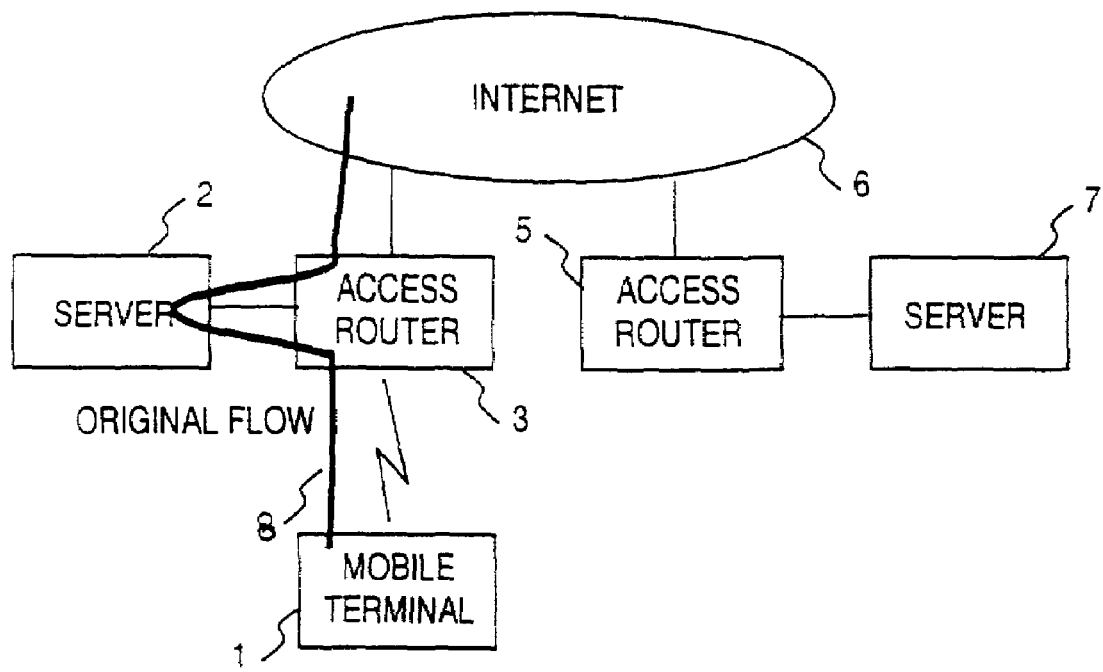
FIG. 1a illustrates one embodiment of a flow anchor prior to a movement of a mobile node.

In the following description, numerous specific details are set forth in order to provide a thorough understanding of the present invention. It will be apparent, however, to one skilled in the art that these specific details need not be employed to practice the present invention. In other instances, well known materials or methods have not been described in detail in order to avoid unnecessarily obscuring of the present invention.

A method for maintaining network flows of mobile nodes, which are receiving services through an access router, after the mobile nodes change the access router is described. More specifically, the present invention describes "flow anchoring", a method of transferring all active original network flows from an attached access node to an original access node that the mobile node was attached to prior to changing its point of attachment to the network.

Network-Related Technology

As indicated above, the present invention provides method of anchoring network flows. Accordingly, some introduction to network-related technology is helpful in understanding the present invention.

Embodiments of the present invention utilize Mobile Nodes, Home Agents, Care of Address and Foreign Agent concepts. A Mobile Node is a node that changes its point of attachment to the Internet. A Home Agent is an anchor router that effectively causes a mobile node to be reachable at its home address, address assigned to the mobile node, even when the mobile node is not attached to its original (home) network. When the mobile node is not attached to its original network, an IP address representing a Care of Address, is assigned to the mobile node at its current point of attachment. A Foreign Agent is a mobility agent that assists the mobile node in receiving data transmitted to its Care of Address.

Some embodiments of the present invention utilize Network Address Translation (NAT). NAT is a scheme that allows two connected networks to use different and incompatible IP addressing schemes, for example private IPv4 addresses and global IPv4 addresses. This allows hosts on a private internal network to transparently communicate with destinations on an external network or vice versa. NAT also refers to the name of a device that performs the above-described functions.

In addition to NAT, some embodiments of the present invention utilize NAT-PT, a form of IPv4–IPv6 protocol translation with "v6 inside" NAT-PT, the IPv6 node is located inside the translator and the IPv4 note is located outside the translator.

Another component of one embodiment of the present invention is a Remote Authentication Dial-In User Service (RADIUS). RADIUS is a security service for authenticating and authorizing nodes when they access the network, such as dial-up users or mobile nodes. A mobile network may have a RADIUS server attached to the access router to provide authentication services. Upon mobile nodes attaching to the access router, the access router sends authentication requests to the RADIUS server. The RADIUS server authenticates users and authorizes access to internal network resources. Remote users are clients to the access router and the access router is a client to the RADIUS server.

Description of some embodiments of the present invention utilizes a concept of transparency. Transparency is the Internet concept of a single universal logical addressing scheme and mechanisms by which packets may flow from source to destination essentially unaltered.

Other components of embodiments of the present invention are fully transparent servers, partially transparent promiscuous servers and non-promiscuous servers. A fully transparent server is a server that does not modify headers of the packets that pass through the server. A partially transparent server modifies a source IP address in packets that pass through it to its own IP address. Partially transparent servers are promiscuous servers because they accept received packets with any destination address and forward the packets with the unmodified destination address. Non-promiscuous servers, on the other hand, require the destination address in all received packets to be the IP address of the server itself, and all the packets transmitted by the non-promiscuous server contain an IP source address of the server. A server is stateful when it maintains information (state) about the service that it is providing during the duration of the service, i.e. network flow.

Methodology

With these concepts in mind exemplary embodiments of the present invention may be further explored. FIG. 1a illustrates a flow anchor according to one embodiment of the present invention. A mobile node ("MN") 1 is wirelessly attached to an access router ("AR") 3, which is attached to a server 2. According to one embodiment of the present invention, the server 2 is attached to the AR 3 by a direct link. In another embodiment, the server 2 may be attached to the AR 3 via a network, such as the Internet. Upon, the MN 1 initiating a flow 8, labeled as an "original flow 8", that requires servicing by the server 2, the AR 3 routes the flow through the server 2 before forwarding it to the Internet 6.

Figure 1B:
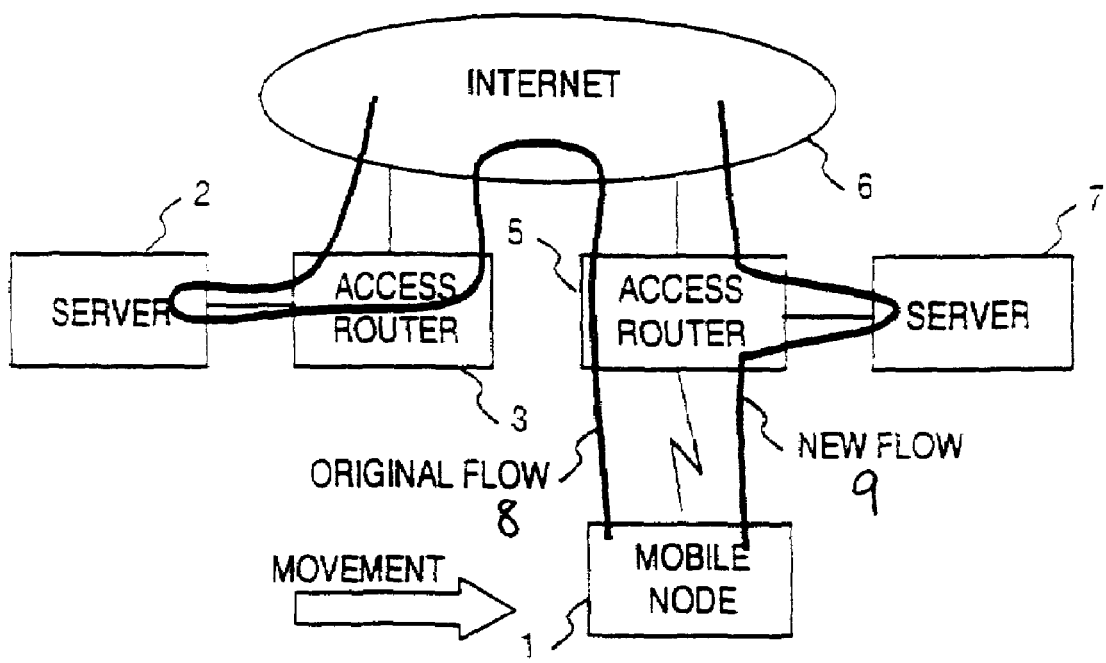
FIG. 1b illustrates one embodiment of a flow anchor subsequent to a movement of a mobile node.
Figure 2:
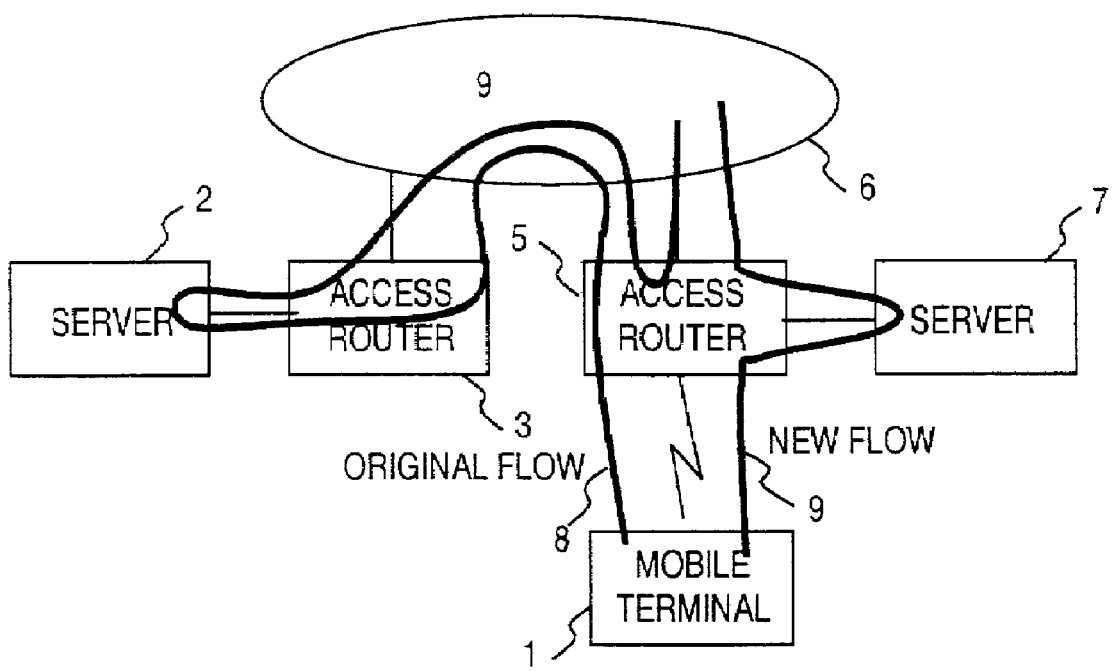
FIG. 2 illustrates one embodiment of a flow anchor with a u-turn.
Figure 3:
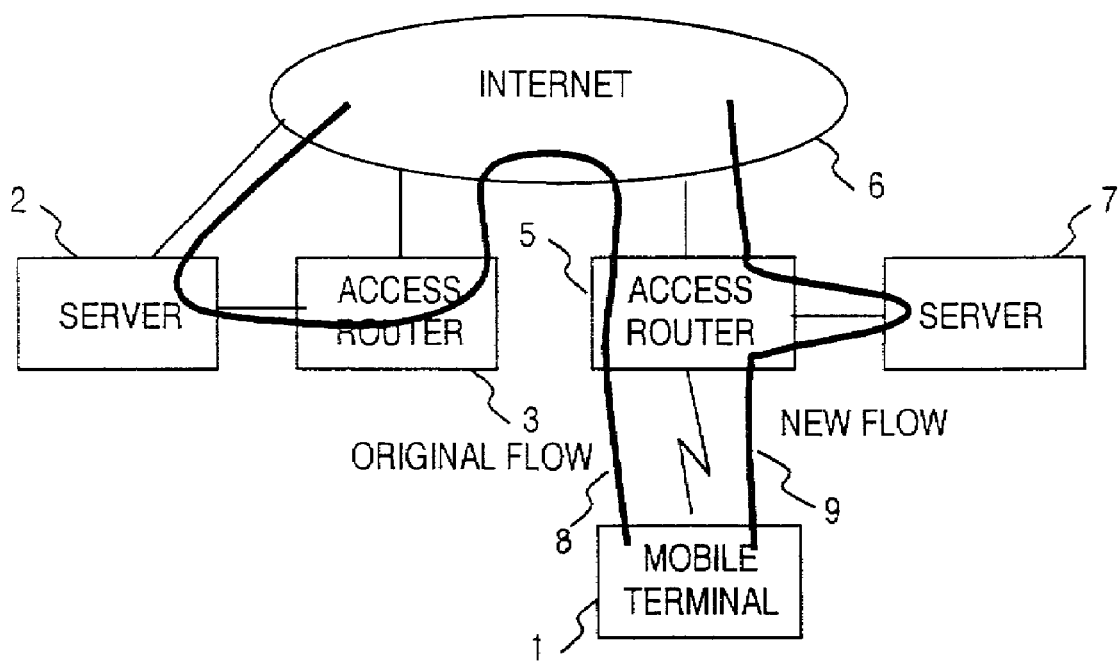
FIG. 3 illustrates one embodiment a flow anchor with a flow passing directly from a server to the internet.

FIG. 1b illustrates one embodiment where the MN 1 moves and utilizes a new AR 5 to access the Internet 6. In order to ensure that the MN 1 receives the same service, the original flow 8 must be routed by the new AR 5 to the old AR 3, which in turn passes the flow through the original server 2. However, a new flow 9, initiated by the MN 1 after the movement, is routed through a server 7, which is the server attached to the AR 5. As can be seen from FIG. 1b, access routers may need to know which server should handle each flow, and how to route the flow to that server.

Figure 4:
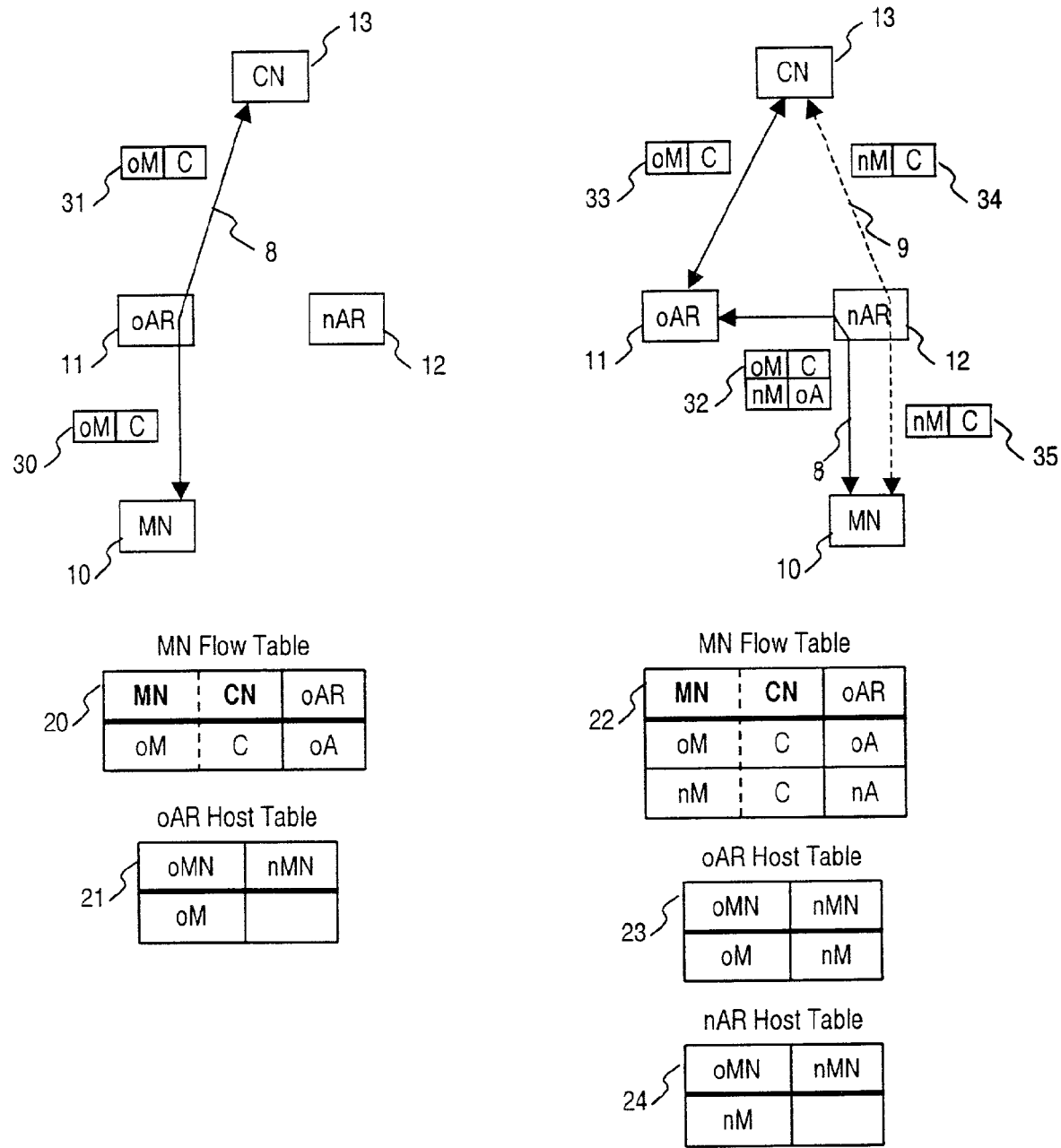
FIG. 4 illustrates one embodiment of a flow anchor with no Mobile IP and Mobile Node awareness of anchoring.

FIG. 4 illustrates a mobile node MN 10 that is originally attached to an access router (AR) oAR 11 via a wireless link according to one embodiment of the present invention. It will be appreciated that MN 10 may be attached to the oAR 11 via a wired link, a tunnel through a wired network, or a combination of the above attachments. In one embodiment the MN 10 originally has a single flow with a Correspondent Node (CN) 13, as shown by a solid arrow 8 on the left side of FIG. 4 prior to moving to another access router nAR 12. An internet infrastructure, not shown, consisting of routers and links connects the oAR 11, nAR 12, and CN 13 to allow the components to exchange IP packets with each other and with MN 10 according to one embodiment of the present invention.

The upper right hand side of FIG. 4 illustrates an embodiment when the MN 10 has moved and is attached to the network via the new AR nAR 12. Upon moving, the MN 10 establishes a new flow with the CN 13, as shown by a dashed arrow on the upper right side of FIG. 4. The original flow 8 remains anchored at the oAR 11, as shown by the solid arrows on the right side of FIG. 4.

According to one embodiment each AR maintains an AR Host Table (tables 21, 23, and 24 in FIG. 4). This table may contain an entry for each MN that is currently attached, or was formerly attached and still has flows going through the AR. Each entry may have two values, oMN, which is the address originally assigned to the MN by the AR, and nMN, which is the address of the M at its current location. For instance, oAR Host Table 21 has an entry for the MN with value oMN set to address oM, and value nMN set to nothing since the MN has not yet moved to another AR.

According to one embodiment each MN maintains an MN Flow Table (for instance, table 20 in FIG. 4) describing the addresses used and the original AR for each flow active in the MN. The column labeled oAR may store the IP address of the original AR. In one embodiment, the addresses may be either all IPv4 addresses or all IPv6 addresses. For the flow shown in the MN flow table 20, the original AR is the oAR 11, and its address is oA. The column labeled CN stores the IP address of the correspondent node that the mobile node is communicating with. The IP address is shown as C. The column labeled MN stores the IP address assigned to the MN 10 by the AR, in this case oM.

Figure 5:
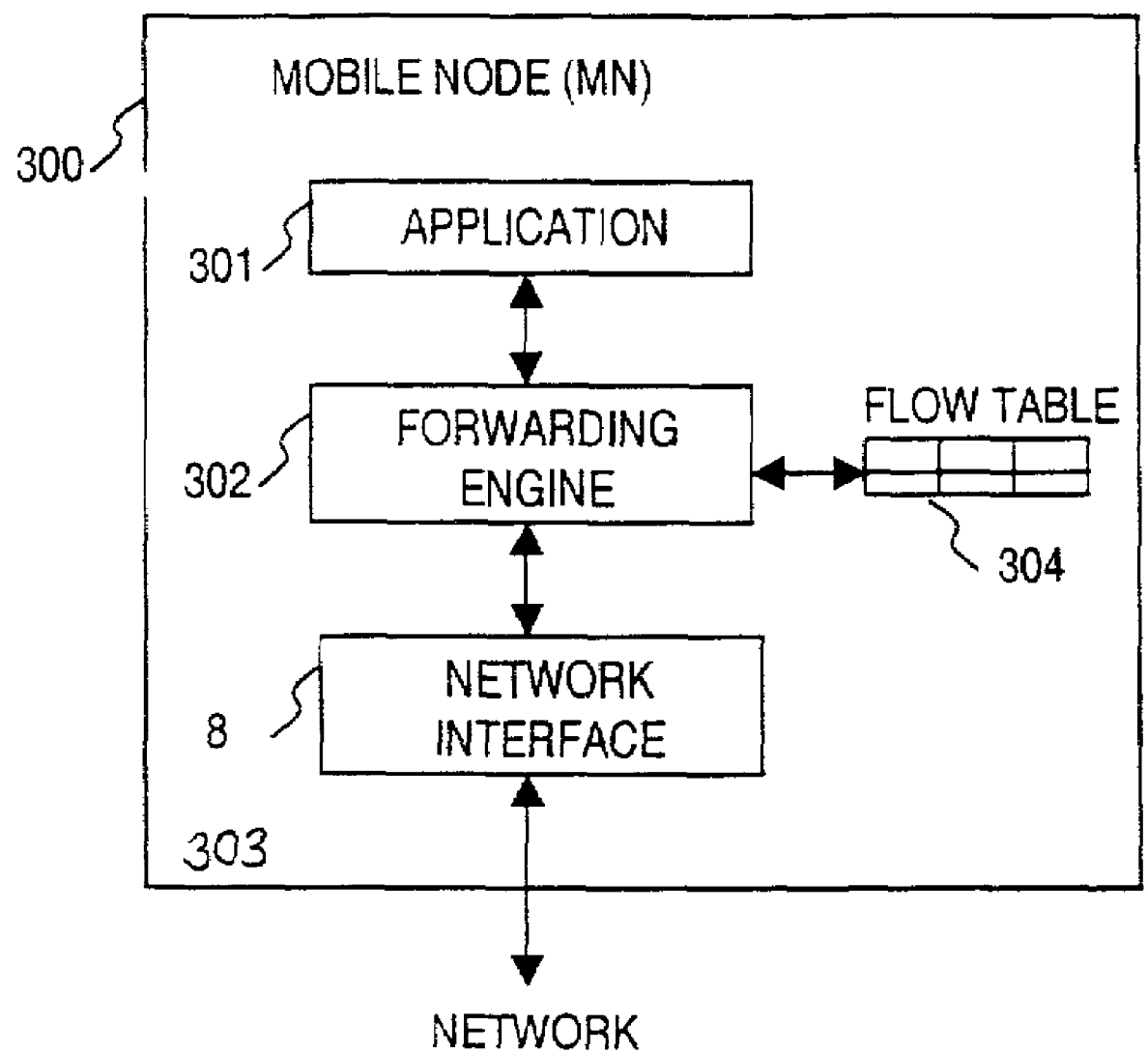
FIG. 5 illustrates an exemplary internal architecture of a Mobile Node.

FIG. 5 illustrates an internal structure of an MN 300 according to one embodiment of the present invention. Packets may be transmitted by an application 301 to an MN's forwarding engine 302. The forwarding engine 302 consults a flow table 304, identifies the flow, and determines how to format the packet for transmission via a network interface 303. In one embodiment the forwarding engine may identify the flow using a 5-tuple format consisting of source IP address, destination IP address, protocol number, source port number, and destination port number.

In one embodiment the two port numbers used in the 5-tuple format by the forwarding engine 302 are contained in the transport layer (for example TCP or UDP), of which there is only one per packet. As such, it is not necessary to depict these port numbers in the various flow tables.

In one embodiment the IP addresses and the protocol number are contained in the IP header, of which there can be more than one in a given packet due to encapsulation. For better illustration the addresses of the IP header used for flow identification are depicted in the flow tables through the use of bold font in the column labels, and with a dashed line between the two addresses. For flow table 20 of FIG. 4, therefore, the IP header with the MN and CN addresses is used to supply the IP addresses and the protocol number for flow identification. This bold font convention is used throughout the figures to describe the IP header used for flow identification. For simplicity, the protocol number is not shown.

According to one embodiment of the present invention, a flow table entry may be created in the MN Flow Table either when the application 301 sends a packet to the forwarding engine 302 for a non-existing flow, or the forwarding engine 302 receives a packet from a network interface 303 for a non-existing flow. In the latter case, the inner-most IP header of the packet arriving from the current AR is used to identify the flow. Upon receiving a packet, the forwarding engine 302 may create a new entry in the MN flow table, with value oAR set to the address of the currently attached AR (oA in the MN flow table 20), value MN set to the current address of the MN (oM), and value CN set to the destination host (C).

In one embodiment, packets sent and received by the MN may go through its attached AR. FIG. 4 shows the packets 30 and 31 that are sent and received by the various nodes, on the left hand side. Shown for each packet is the source and destination IP addresses for each IP header in a packet. By convention, the address on the left is the source IP address for packets traveling from the MN to the CN, and is the destination IP address for packets traveling from the CN to the MN. Conversely, the address on the right is the destination IP address for packets traveling from the MN to the CN, and is the source IP address for packets traveling from the CN to the MN. This convention is true for all figures unless otherwise stated.

For example, a packet 30 sent from the MN 10 to the oAR 11 has a source address of oM (that of the MN 10) and a destination address of C (that of the CN 13). The packet remains unchanged while traveling from the oAR 11 to the CN 13 (packet 31). The fact that the packet is unchanged is illustrated by a solid arrow passing through the oAR 11. The source and destination addresses are reversed for packets from the CN 13 to the MN 10. Because packets for this flow naturally travel through the oAR 11, the packets are identical to normal (non-flow anchored) IP packets sent through the internet and do not require special handling.

FIG. 4 does not show fully transparent servers that may be attached to the oAR 11. It will be appreciated that a fully transparent server may be fully incorporated into the AR itself, for instance in a case of a header compression. In addition, it will be understood that the access router may be connected to the server not via a physical link, but rather through the Internet. There are also may be multiple servers attached to a given access router. The use of external (or internal) fully transparent servers is a common function of current routers and is well known in the art. It will be appreciated that not shown fully transparent servers are part of the described network.

In one embodiment when the MN 10 moves to the nAR 12, it is assigned an address nM by the nAR 12, and the nAR 12 establishes an entry for the MN 10 in the nAR host table 24. As soon as the MN 10 obtains its new address, it sends a message to the oAR 11 containing its new address, upon the receipt of which the oAR 11 updates an entry corresponding to the MN 10 in its host table 23. The MN 10 starts a new flow 9, as shown by the second entry in its flow table 22.

According to one embodiment of the present invention, when the forwarding engine of the MN 10 receives a packet for the original flow 8 from the application, it consults its flow table 22. It finds that the oAR address is oA, which is not the same as the address of its currently attached AR, the nAR 12. As a result, the MN 10 tunnels the packet to the oAR 11 by encapsulating the packet in an additional header with nM as the source address and oA as the destination address. This encapsulated header is shown as a packet 32 in FIG. 4 where the lower header represents the outer header, the first header transmitted and received. Upon receiving the packet 32 the nAR 12 notes that the outer header has a source address of one of its attached MNs, but that the inner header has a different source address. In one embodiment, the nAR 12 then forwards the packet directly to the oAR 11 instead of to a fully transparent server attached to it.

Upon receiving the packet the oAR 11 decapsulates it (strips the outer header), and processes the inner header by looking into its host table 23. Retrieving the source address of oM from the inner header, the oAR 23 finds a match in its host table, and passes the packet 33 through a fully transparent server(s), and forwards the packet 33 to the CN 13. By convention, because the oAR 11 modified the packet (by decapsulating it), it is depicted by terminating a solid arrow at the oAR 11 in FIG. 4. Throughout the drawings in this patent, any time a packet is modified by an AR (or HA), either by decapsulation/encapsulation or by modifying an address, it is depicted by terminating an arrow at the corresponding access router (or home agent).

According to one embodiment when the oAR 11 receives a packet 33 from the CN 13, it looks into its host table 23 and determines that the MN 10 is no longer attached to it, but rather has address nM. As a result, the oAR 11 encapsulates the packet with its own address oA as the source address, and nM as the destination address (packet 32). When the nAR 12 receives this packet, it determines that the packet should not be routed through the attached fully transparent server(s), and forwards the packet unchanged to the MN 10.

According to one embodiment of the present invention, upon the MN 10 changing its location and attaching to yet another AR (not shown), it executes the same operations relative to the original flow 8 as it did the first time it moved. More specifically, the MN 10 informs the oAR 11 of its new address, and it encapsulates packets so that they flow through the oAR 11. The packets would no longer flow through the nAR 12.

When the last flow anchored at the oAR 11 ends, according to one embodiment, the MN 10 sends a message to the oAR 11 informing it that it can delete the entry from its host table 23. In one embodiment, the MN 10 may send the message to the oAR 11 when the application terminates the socket that was used for the flow. In another embodiment, the oAR 11 may simply delete the entry after a predetermined period of inactivity.

It will be appreciated that while the ARs 11 and 12 and the MN 10 utilize the flow anchor functionality described above, the CN 13 is a standard "legacy" IP host with no awareness of flow anchoring and change of the MN 10's address.

According to one embodiment of the present invention, the MN may be attached to two ARs at the same time. In addition, the MN may have two addresses, oM and nM, at the same time. In this embodiment, oAR may maintain an additional state in its host table 23 indicating that both oM and nM are actively in use upon receiving a message from the MN informing it of MN's new address nM, while still being attached to oAR 11 directly. In this case, either or both packets 30 and 32 may be transmitted. Such simultaneous connectivity is invisible to the CN 13 in one embodiment of the present invention.

In one embodiment of the present invention, the ARs are executing NAT. In this embodiment all the packets between CN 13 and the oAR 11 traverse the NAT device. The presence of NAT does not change the functionality of flow anchoring described above. It will be appreciated that the above-described method also need not be modified in an embodiment that utilizes NAT-PT, where the MN 10 is an IPv6 node, and the CN 13 is an IPv4 node.

Most access technologies well known in the art are able to maintain a proper sequence of packets between the MN and the AR. This sequencing may be necessary for the proper operation of certain services at the original AR, for instance header compression. Since IP itself carries no information about sequencing, a tunneling protocol may be carried between the two IP headers 32. Such use of tunnels is well known in the art and does not require further explanation here.

Figure 6:
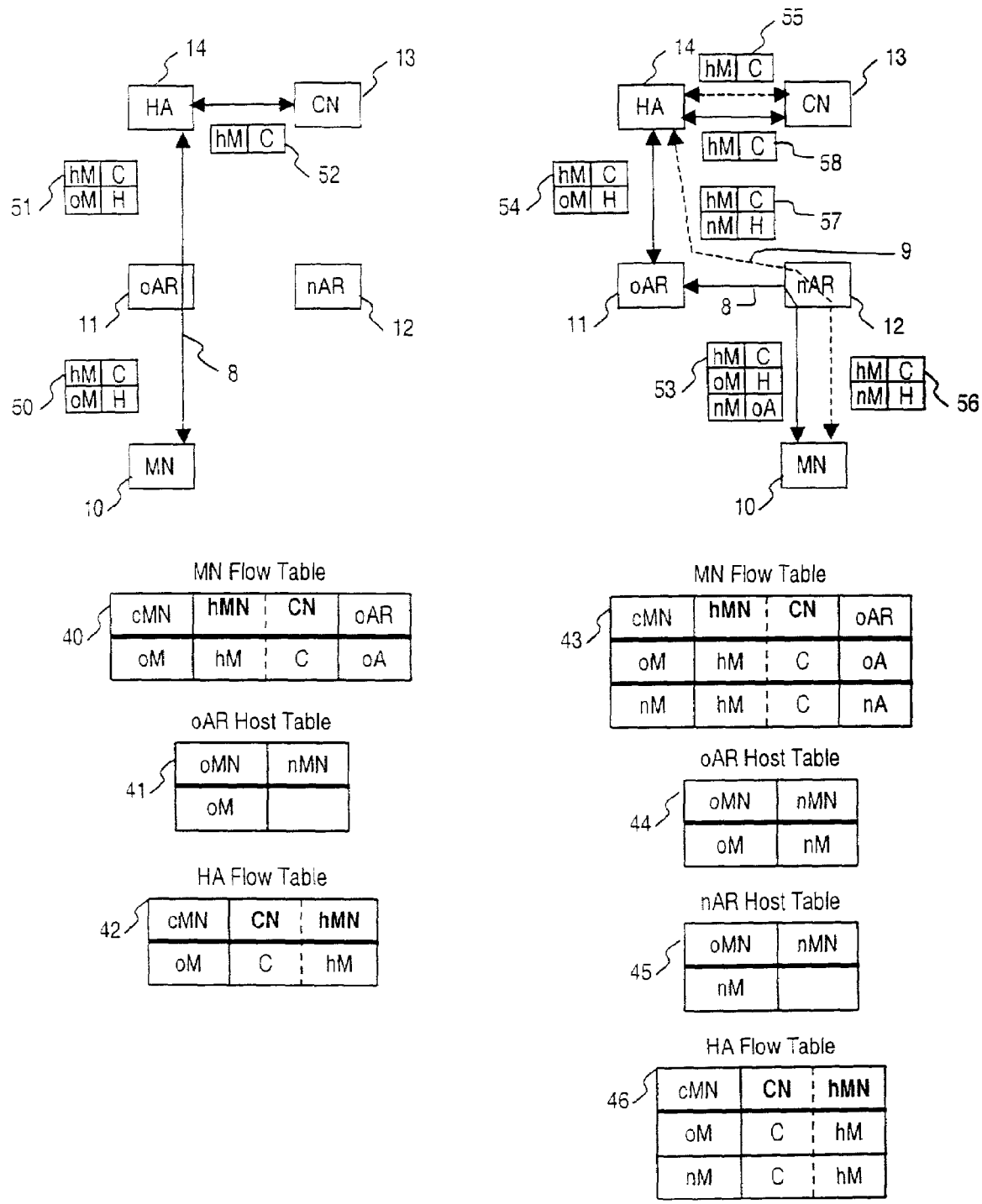
FIG. 6 illustrates one embodiment of a flow anchor with Mobile Node awareness of anchoring and utilization of Mobile IP and Care-of-Addresses.

FIG. 6 illustrates the MN 10 running Mobile IP (MIP), and utilizing a Home Agent (HA) 14 and a co-located Care-of Address (CoA) according to one embodiment of the present invention. The Home Address of the MN 10 is hM, and the IP address of the HA 14 is H. In this embodiment IP-in-IP encapsulation is used to route a packet between the MN and the HA. The outer header of the packets 50, 51 for the original flow 8 contains the CoA oM and the HA address H. Likewise, after the MN 10 moves to the nAR 12, its new CoA is nM, and the outer header of the packets 56, 57 in the new flow 9 contains the CoA nM and the HA address H. The HA 14 strips the outer header before forwarding the packet to the CN 13. Therefore the CN 13 believes that it is talking to address hM continuously. The above is a normal operation of MIP.

In one embodiment, the packet that would otherwise normally be transmitted is encapsulated in a new header containing addresses nM and oA (packet 53). The MN 10 uses its home address hM along with the CN address C for flow identification. This is reflected in the MN flow tables 40 and 43, where the column formerly labeled MN (in FIG. 4, tables 20 and 22) is now labeled cMN, to reflect the fact that this is a CoA rather than the "native" address of the MN. The new column labeled hMN gives the home address of the MN 10, which remains hM even as MN 10 moves.

The HA 14 knows when the MN has moved through normal operation of MIP. In order to ensure that the HA 14 identifies which flows to anchor through the oAR 11, and which through the nAR 12 (or any other ARs the MN may have moved to and originated flows at), the HA 14 maintains a flow table 42, 46 analogous to the MN flow table according to one embodiment. In one embodiment the column labeled cMN in the HA flow table 42 stores the MN's 10 CoA. The column labeled CN stores the CN address. The column labeled hMN stores the home address of the MN 10. The CN address and hMN address are used to identify the flow, as is the case with the MN flow tables 40 and 43.

In one embodiment of the present invention, when a packet arrives at the HA 14, it can identify which MN the packet is from/to by the home address hM. The HA 14 then searches the HA flow table to see if the flow is already in the table. If it is not, then the flow is added, for instance as shown for the original flow 8 in the HA flow table 42. The values for CN and hMN (and the protocol and port numbers, not shown) are taken from the packet itself. The value for cMN is set to the current CoA of the MN 10, as known from the tables required for normal MIP operation. If on the other hand the flow is already in the HA flow table, the packet is encapsulated and forwarded to the MN given by the hMN value in the flow's entry.

In one embodiment the flows can be deleted from the HA flow table after a pre-determined period of inactivity, i.e., no packets for that flow are received during the pre-determined time period. In another embodiment the MN 10 may send a message to the HA 14 when all flows relative to a given AR have ended, allowing the HA 14 to delete all flows associated with that AR. Yet in another embodiment, the MN 10 may send a message to the HA 14 every time a flow has ended, and the HA 14 may delete the specific flow. It will be appreciated that a combination of these methods may also be used.

According to one embodiment of the present invention, NAT may be used between the ARs 11, 12 and the HA 14. In another embodiment, NAT may also be used between the HA 14 and the CN 13. The MN 10 may also be simultaneously attached to more than one AR at a time. In one embodiment a tunnel header may be inserted above the outer header for a particular tunnel that is being used, for example a GRE tunnel. Both IPv4 and IPv6 may be utilized in the embodiment of FIG. 6.

In one embodiment a partially transparent server may be utilized instead of a fully transparent server. In this embodiment the partially transparent server modifies the source address of packets going to the CN to its own address. The upper left side of FIG. 7 explicitly shows the new flow $8^1$ passing through a server nS 15. The packet 60 on its way to the CN has a source address of nM. After the server nS 15 receives the packet and operates on it, it transmits a packet 61 with a source address of nS. The same holds for the original flow 8 shown in the lower left hand side of FIG. 7, with the IP address of a server oS 18 as the source address in packet 64 transmitted to the CN.

Figure 7:
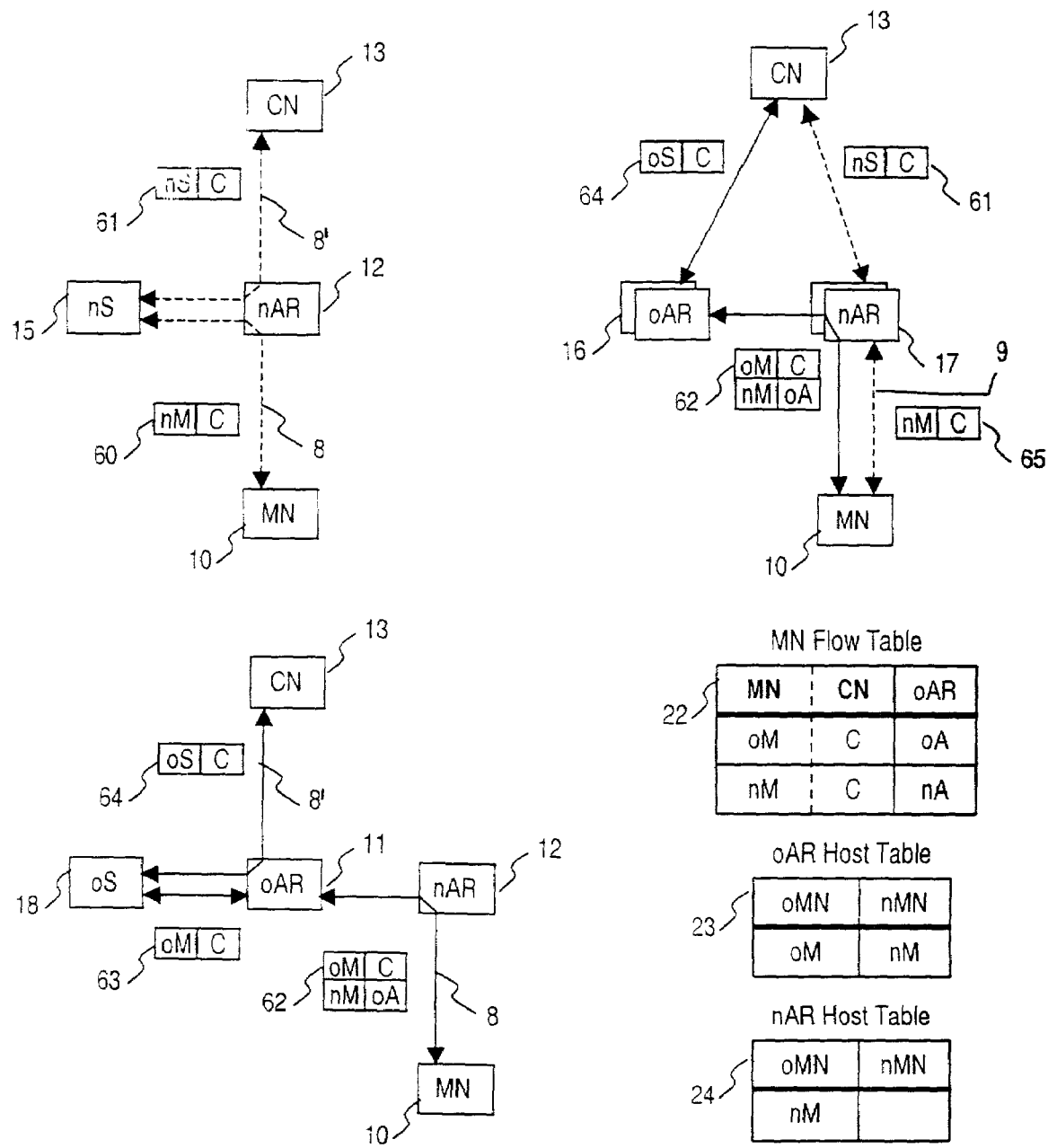
FIG. 7 illustrates one embodiment of a flow anchor utilizing partially transparent servers.

The upper right hand side of FIG. 7 shows both flows after the MN 10 has moved. The combined server nS 15 and nAR 12 are shown as a shadowed box 17. Likewise the combined server oS 18 and oAR 11 are shown as a shadowed box 16. By convention a shadowed box represents a packet traveling from the AR, through the server, and back again, with the corresponding re-write of the appropriate IP address field as shown. This convention holds throughout the figures illustrating the convention of the present invention.

In an embodiment where the partially transparent server is utilized, the MN flow table 22, oAR host table 23, and nAR host table 24 are not changed from an embodiment where the fully transparent server is utilized. For example, when oAR 11 receives the packet 64 from the server oS 18, the packet has the source address of the server oS 18, rather than that of the MN 10, and the oAR 11 simply forwards the packet to the CN 13 with no special handling. The packet 63 from the server oS 18 to the MN 10 have the same addresses as those received from the CN 13 in an embodiment described with reference to FIG. 4 and are encapsulated in an IP header, as with packet 62, and forwarded to the MN 10.

In one embodiment the non-promiscuous servers are utilized. In this embodiment, the AR, e.g., the oAR 11, may modify the destination address C of the packet 63 from the oAR 11 to the oS 18 to oS, the destination address of the oS 18. The oS 18 would then itself determine the appropriate destination for the packet and transmit a packet 64. A NAT function in the oAR 11 would recompose the packet 63 from the oS 18 into the packet 64. The operations and handling of fully transparent, partially transparent, and non-transparent servers are well known in the art and do not require detailed explanations.

Figure 8:
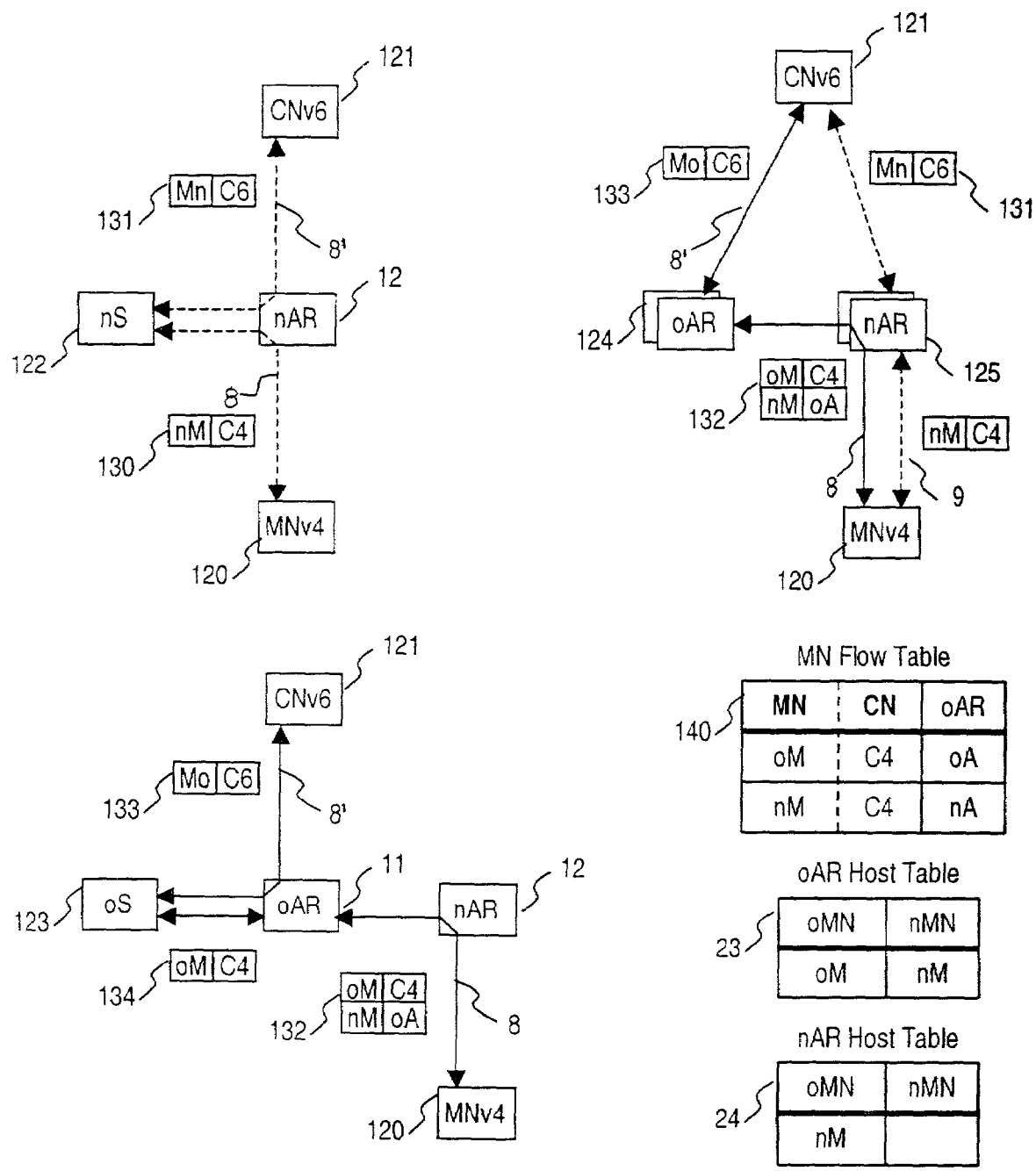
FIG. 8 illustrates one embodiment of a flow anchor utilizing a "v4 inside" NAT-PT IPv4/IPv6 translation device.

In one embodiment, illustrated in FIG. 8, the servers 122, 123 may be a "v4 inside" NAT-PT IPv4/IPv6 translation devices. In this embodiment, the MN, MNv4 120, is an IPv4 node, and the CN, CNv6 121, is an IPv6 node. The servers 122, 123 translate between IPv4 and IPv6. The ARs 11, 12 may be dual-stack ARs and may route both IPv4 and IPv6 packets. An IPv4 address C4 assigned to both translators 122 and 123 is used to represent CNv6's 121 IPv6 address C6 and is visible to the MNv4 120 as the destination CNv6 121 address C4. Likewise, the translators oS 123 and nS 122 have IPv6 addresses Mo and Mn respectively assigned to them that represent the MNv4 120 to outside IPv6 nodes. The translators 122, 123 translate between these IPv4 and IPv6 addresses as shown in FIG. 8.

The other IP flow anchor operations of the embodiment illustrated in FIG. 8 are identical to the operations of the embodiment described with reference to FIG. 4.

Figure 9:
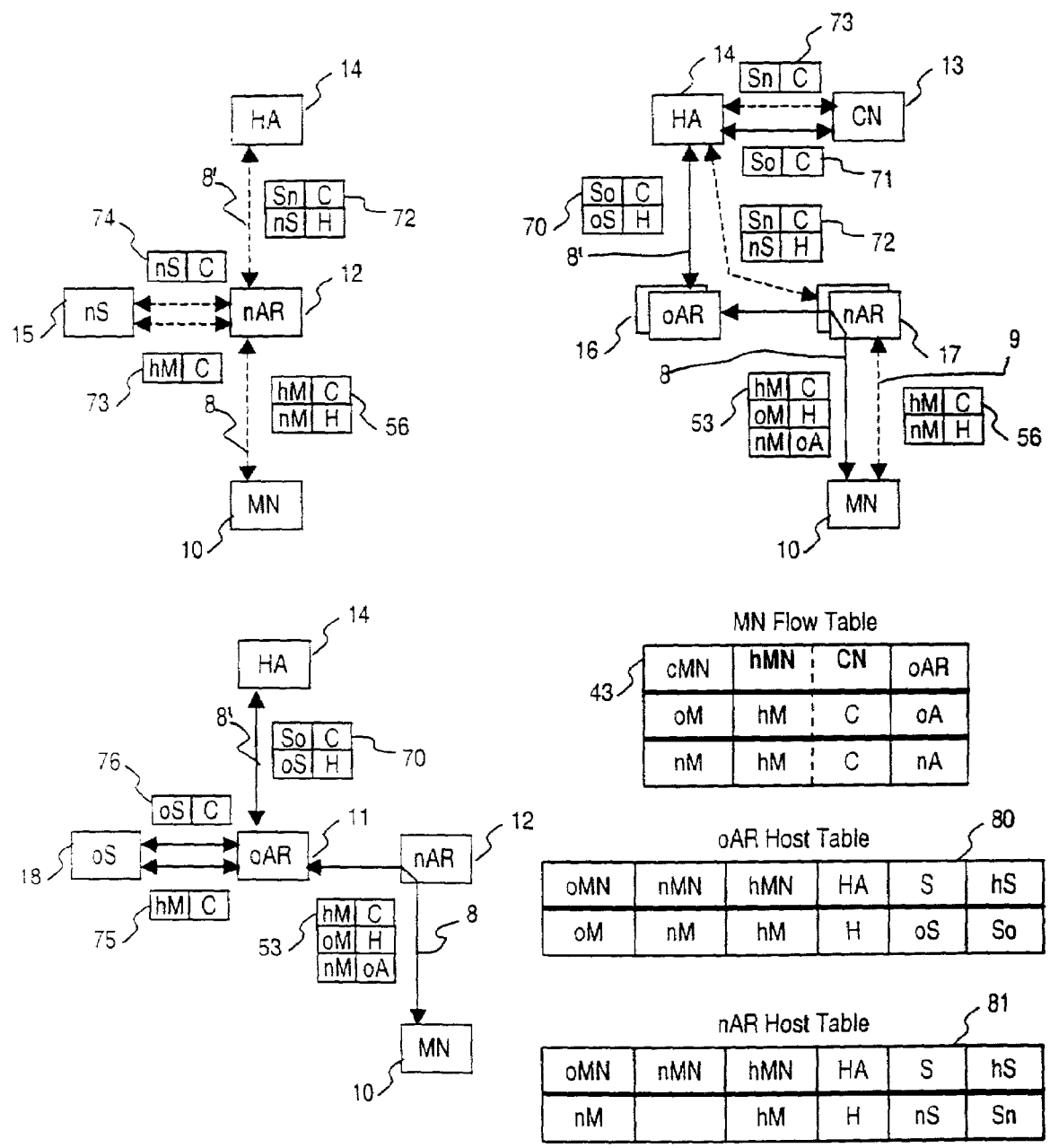
FIG. 9 illustrates one embodiment of a flow anchor utilizing a Mobile IP, Care-if-Address and partially transparent servers.

In one embodiment illustrated in FIG. 9 partially transparent servers 15, 18 are utilized. In this embodiment, the ARs 11, 12 proxies the MIP protocol on behalf of the servers 15, 18 in order to ensure that packets travel through the HA 14. In another embodiment the servers 15 and 18 may also run the MIP protocol. In addition, a "legacy" server (non-MIP capable) may be used due to the ARs 11 and 12 proxying MIP.

In one embodiment the MN 10 is unaware of the presence of the servers 15 and 18. Because of the partially transparent servers 15, 18, however, the HA believes the servers 15, 18 to be mobile nodes, not MN 10. Because the servers themselves do not require a flow anchor, the HA does not need to keep track of individual flows, as a result, the HA may be a "legacy" HA.

According to one embodiment of the present invention, the ARs 11, 12 may proxy packets from the servers 15, 18 as coming from the HA 14, because the MN 10 believes that it is talking to the HA 14. In order to be able to proxy, the ARs 11 and 12 may maintain additional states in the AR host tables 80, 81. In addition to the columns labeled oMN and nMN, the AR host tables 80, 81 may create four additional columns. The column labeled S contains the address of the servers 15, 18. This address is used as the co-located CoA in packets exchanged with the HA 14. The column labeled hS is the home address of the servers 15, 18. The column labeled HA is the address of the HA 14 for both the MN 10 and the servers 15, 18. The column labeled hMN is the home address of the MN 10. It will be noted that there is a one-to-one correspondence between S, the address of the servers 15, 18, and the HA used for the server. In one embodiment a different HA may be used, for example to provide routing of packets from a different MN to a different VPN, and a different address S may be used.

In one embodiment illustrated in the lower left-hand side of FIG. 9, when the oAR 11 receives a packet 53 from the MN 10, it strips the outer header of the packet. Because it is proxying the HA, it also strips the next header (oM/H), and transmits a packet 75 to the oS 18. When a packet 76 is subsequently received by the oAR 11 from the oS 18, the oAR 11 searches its host table 80 with the source address oS, and finds the entry indicating that H is the IP address of the oS 18's HA, and that the home address of the oS 18 is So. The oAR 11 then composes a packet 70, which appears to the HA 14 to be a packet coming from the MN with CoA oS and home address So.

In one embodiment the oAR 11 receives the packet 70 from the HA 14, which it transforms back into what is expected by the oS 18, the packet 76. When the oAR 11 receives the packet 75 from the oS 18, it searches its host table 80 for an entry matching the home address hM. While proxying the HA 14 on behalf of the MN 10, it adds the header (oM/H) to mimic the header that would have been sent by the HA 14. In addition the oAR 11 adds the tunnel header (nM/oA), and forwards packet 53 to the MN 10.

The additions and deletions of the values oMN and nMN in the AR host tables 80, 81, as well as the values oN and nMN, are performed similar to the addition and deletion operations described with reference to FIG. 6. In one embodiment the value for HA may be known by the ARs 11, 12 by reading the contents of the MIP protocol packets as they pass between the MN 10 and the HA 14. In another embodiment these values may be learned through other means, such as through a configuration server, for example RADIUS. The values for S and hS are related to the HA address by a static configuration, the variety of which are well known in the art.

Figure 10:
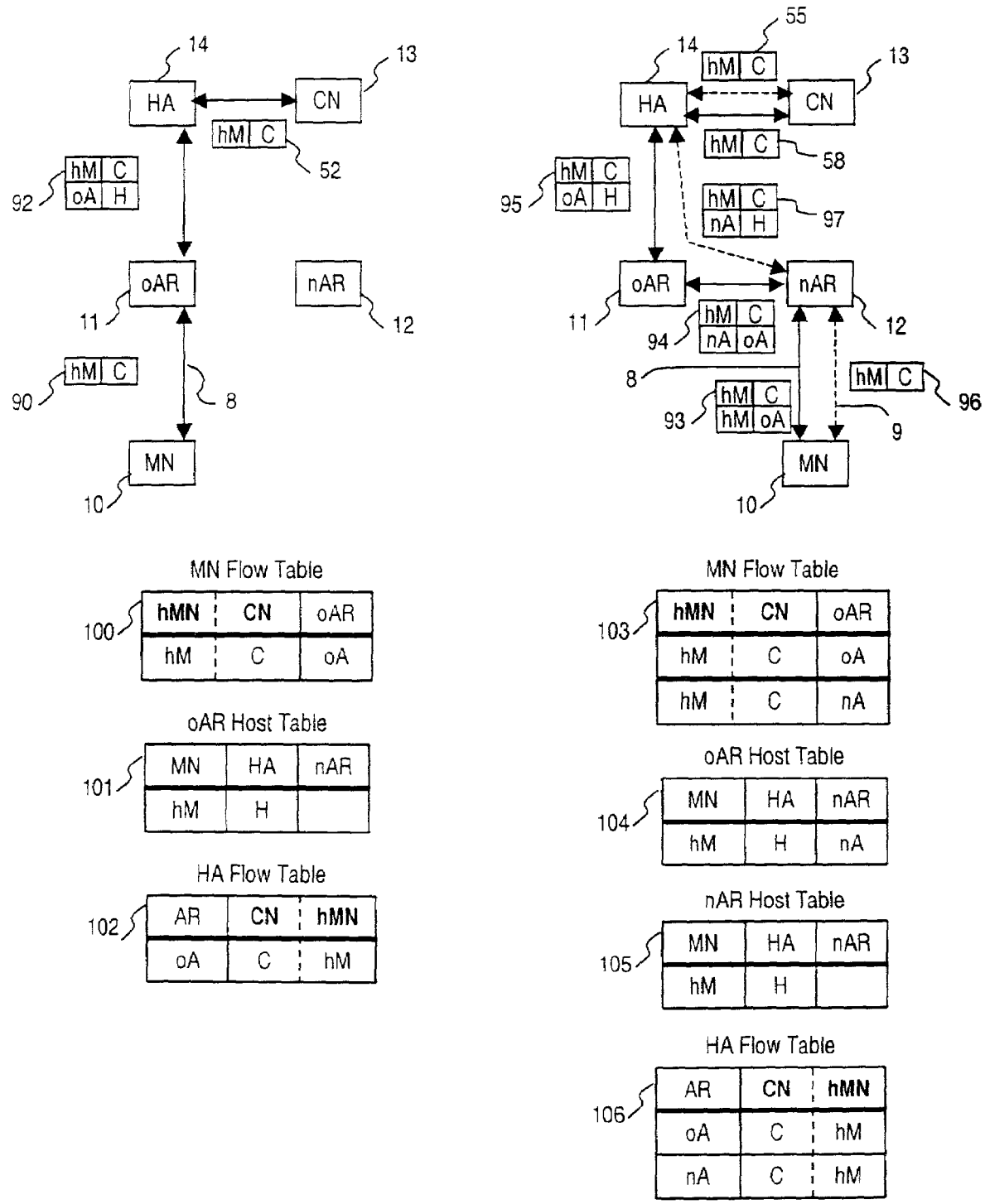
FIG. 10 illustrates one embodiment of a flow anchor utilizing a foreign agent CoA.

In one embodiment illustrated in FIG. 10, the MN 10 may not be using a co-located CoA. As a result, packets may no longer be tunneled directly from the MN 10 to the oAR 11, unmodified by the nAR 12. In this embodiment the source address of the outer header on packets transmitted by MN 10 is set to hM in a packet 93, FIG. 10. It will be noted that the MN 10 no longer need to store its original CoA in its MN flow table 103.

In an embodiment while the MN 10 may not be utilizing a co-located CoA, the message sent from the nAR 12 to the oAR 11 may contain nA, the IP address of the nAR 12, rather than the MN 10's new address. Both ARs 11 and 12 may identify the MN 10 by its home address hM, which is, in one embodiment, the inner header (packets 93, 94, 95). The home address may be learned through the normal operation of MIP, with the ARs 11 and 12 acting as Foreign Agents (FA). In one embodiment the nAR 12 recognizes that a packet is being tunneled and should not be routed through its locally attached server by the fact that the packet is encapsulated with the source addresses of both IP headers set to hM (packet 93). The nAR 12 may then replace the source address of the outer header with that of its own, because the home address hM is not validly routable from the nAR 12 (packet 94). Upon receiving this packet, the oAR 11, functioning as a flow anchor, strips the outer header. Functioning as the FA for the MN 10, the oAR 11 then attaches the outer header shown by the packet 95, as specified by the MIP protocol. In the reverse direction, the oAR 11 tunnels the packet 94 to the nAR 12, which in turn substitutes the home address hM for its own in the packet 93 transmitted to the MN 10.

In this embodiment the HA 14 may maintain flow tables 102, 106 similar to the ones described with reference to FIG. 6. However, in this embodiment the AR address may be used in place of the MN address, both in the HA flow tables 102, 106, and in the messages transmitted from the MN 10 to the HA 14 instructing the HA 14 to delete entries in its flow tables 102, 106.

Figure 11:
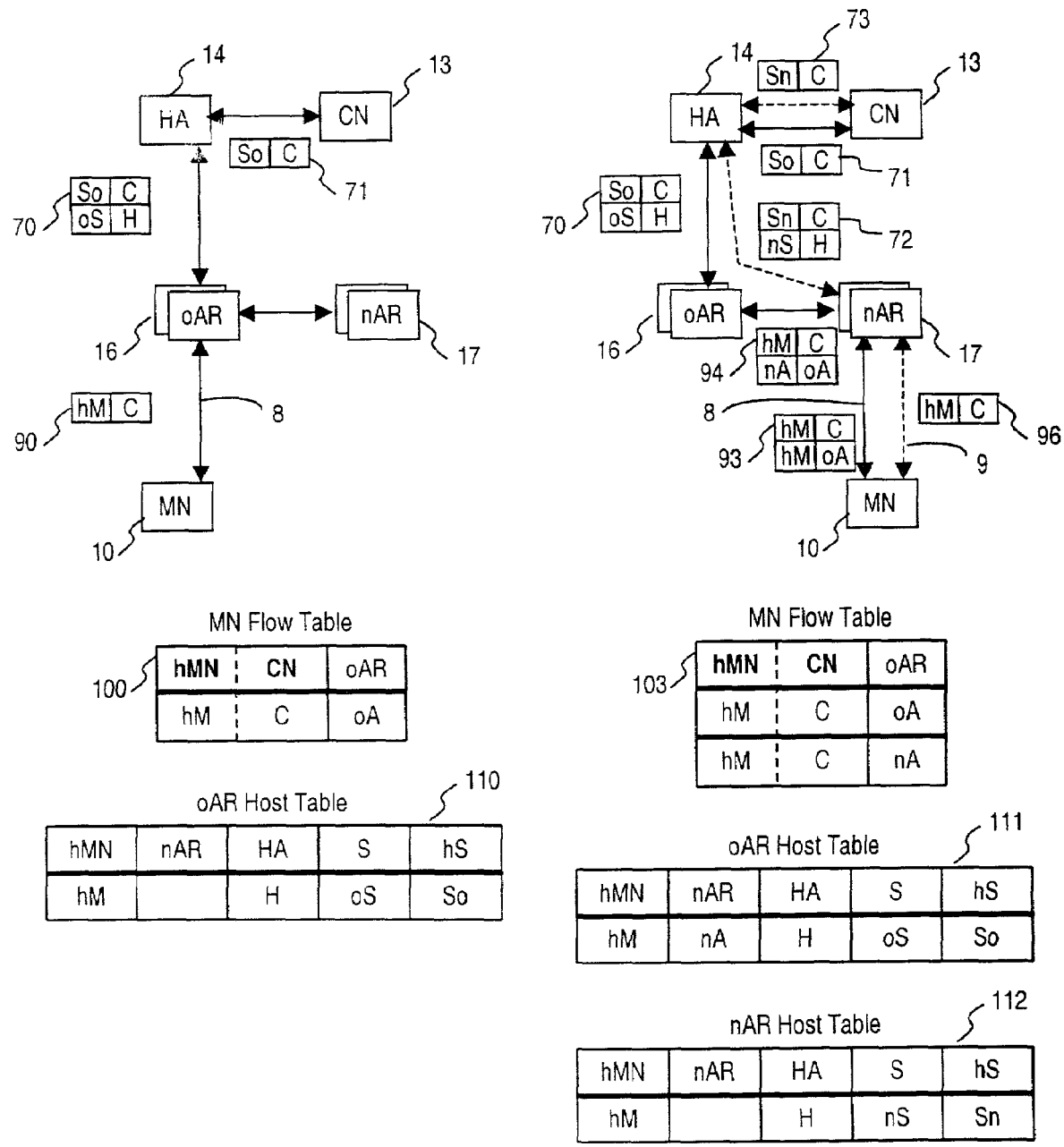
FIG. 11 illustrates one embodiment of a flow anchor utilizing foreign agent CoA and partially transparent servers.

In one embodiment of the present invention, illustrated in FIG. 11, foreign agent CoA and partially transparent servers are utilized. The operations between the ARs 16 and 17 and the MN 10 are similar to the operations described above with reference to FIG. 10. The operations between the ARs, servers and the HA are similar to the operations described with reference to FIG. 9. Thus, no further explanation is required.

Figure 12:
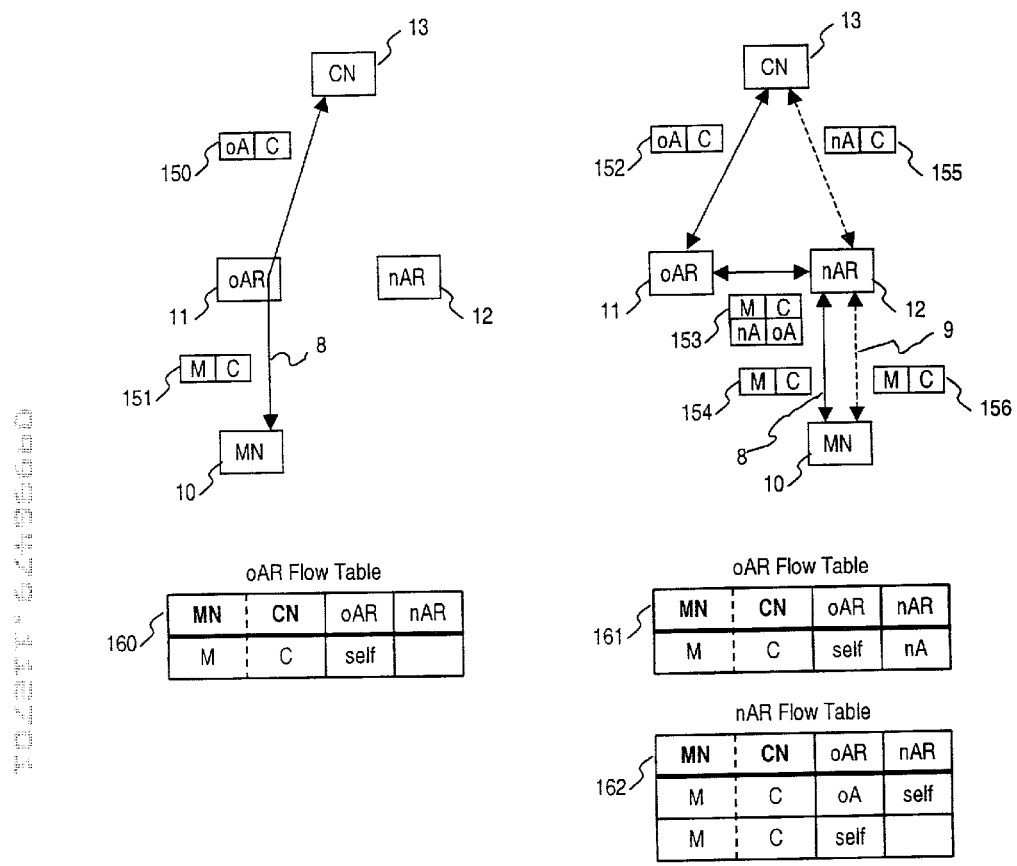
FIG. 12 illustrates one embodiment of a flow anchor with MN awareness of anchoring.

FIG. 12 illustrates an embodiment where the MN 10 is completely unaware that flow anchors are being used. In this embodiment the MN 10 operates as a normal "legacy" IP host and the flow anchor operations are completely handled by the ARs 11, 12 and are invisible to the MN 10. In one embodiment, the ARs 11, 12 may be running NAT (or "v6 inside" NAT-PT) between themselves and the CN 13 in order to handle the flow anchor operations. This is explicitly illustrated in the upper left-hand side of FIG. 12, where the source address issued by the MN 10 in a packet 151 is M, and the oAR 11 translates it to its own address oA in a packet 150.

In the embodiments where the MN is not aware of flow anchoring, the ARs may maintain a flow table rather than host tables. The AR flow table may contain entries for all the flows anchored at that AR for as long as the flow is active. The AR flow table may also contain entries for all flows from the attached MN, whether or not the flow is anchored at the AR.

In the embodiment illustrated in FIG. 12 the oAR 11 maintains a flow table 160, where it has an entry for each of MN 10's flows. In one embodiment when a packet is received, the oAR 11 looks up the flow 8 in its flow table 160, and if the flow is not there it creates a new entry for that flow. For packets from the CN 13, the oAR 11 looks up the flow 8 in its flow table 160 after the NAT is applied. In one embodiment the columns labeled MN and CN in the flow table 160 may contain the flow itself and the column labeled oAR may contain the IP address of the original AR where the flow 8 is anchored. The column labeled nAR may contain the IP address of the AR where the MN 10 is currently attached. In one embodiment when the oAR 11 adds an entry, the value for oAR may be set to itself ("self"), and the value for nAR may be set to null.

In one embodiment when the MN 10 of FIG. 12 moves from the oAR 11 to the nAR 12, the oAR 11 transmits the contents of its flow table 160 to the nAR 12. For each entry where the value of oAR was "self" in the oAR flow table 160, the nAR 12 sets the value of oAR to oA, and sets the value of nAR to "self" in its flow table 162. This produces the first entry in the nAR flow table 162. The second entry in the nAR flow table 162 may be created after a new flow 9 arrives from the MN 10 or the CN 13.

In one embodiment, illustrated in FIG. 13, the MN 10 moves from the nAR 12 to a third AR, cAR (not shown), with address cA. In FIG. 13 the AR flow tables 161, 162 on the left are illustrating the state before the move, and the AR flow tables 163, 164, and 165 on the right are illustrating the state after the move. In this embodiment the nAR 12 transfers its flow table 162 to the cAR's flow table 165. For each entry where the value of oAR was something other than "self" in the nAR flow table 162, the cAR 12 copies the same value over, and sets the value of nAR to "self" in its flow table 162. This is shown as the first entry in flow tables 162 and 165. For each such entry, either the nAR 12 or cAR may send a message to the oAR 11 informing it that the MN 10 is now attached to the cAR. The oAR 11 modifies its corresponding entries in its flow table 163 so that the value of nAR now points to cA. The second entry in the nAR 12 flow table 162 is transferred as already described above for flow tables 160 and 162.

Upon transfer of the flow table 162, the nAR 12 deletes all entries where the value of oAR is something other than "self". For all the remaining entries, its sets the value of nAR to IP address of the current AR, cA. The result of this activity is shown in the flow table 164.

In one embodiment of the present invention, the MN may move twice or more times in quick succession, so that the flow table from the oAR 11 is not fully transferred to the nAR 12 before the MN 10 moves from the nAR 12 to yet another AR, for example cAR. In this case, the nAR 12 may pass the subsequent entries received from the oAR 11 to the cAR.

According to one embodiment of the present invention, an AR may fail before it has completed transfer of its flow table to the current AR. For example, the nAR may fail prior to transferring the flow table to the cAR. For flows anchored at the nAR, the nAR's failure does not pose a problem, because those flows will be terminated. For flows anchored at other ARs, however, the nAR's failure poses a problem because the cAR will not learn about those flows and those flows will then fail in spite of the fact that both the current AR and the anchor AR are operating properly. To solve this problem, one or more central nodes, for example a RADIUS server, may keep a table containing a list of all ARs that are currently anchoring flows for the MN. When the MN moves, the central node may be updated with the new location of the MN. If the current AR discovers that it was not able to obtain the complete flow table, it may query the central node, learn of all anchor ARs, and inform them of the MN's change. Alternatively the central node may perform the above operation.

Prior to transferring the flow table to another AR, the transferring AR needs to determine which AR to transfer the flow table to. In one embodiment the MN may notify the current AR of the previous AR In another embodiment the ARs may broadcast notification of such changes to adjacent ARs. Yet in another embodiment, the above-described central node may inform the current AR of the previous AR. Alternatively, the central node may inform the previous AR of the current AR.

In one embodiment of the present invention, transfer of messages between all nodes is authenticated in order to be protected against spoofing or other similar attacks. The methods and techniques of authentication are well know in the art and do not require any further explanation.

In one embodiment nAR 12 of FIG. 12 may attach an outer header used to tunnel a packet 153 from itself to the oAR 11. The nAR 12 accomplishes the attachment by finding an entry in its flow table 162 corresponding to the packet received from the MN 10. It then creates the outer header with a source address of itself, and the destination address set to the value of oAR in the flow table 162. Upon receipt of the packets from the oAR 11, the nAR 12 may strip the outer header from the packets.

According to one embodiment of the present invention multiple MNs may have the same IP address, even while attached to the same AR. In order to ensure that there are no identical entries in the oAR flow table 161 (though this is not shown in FIG. 12), a higher-level identifier, for example NAI or IMSI, may also accompany the entries in the flow table and the messages between ARs, and between AR and the central node. Specifically, everywhere the MN address is conveyed or stored, the higher-level identifier may accompany it. In addition, there may be a tunnel protocol above the outer IP header that has a demultiplexing field, for example a key field in GRE, that may be used to identify the MN. The value of this field may also be stored in the flow table.

Figure 14:
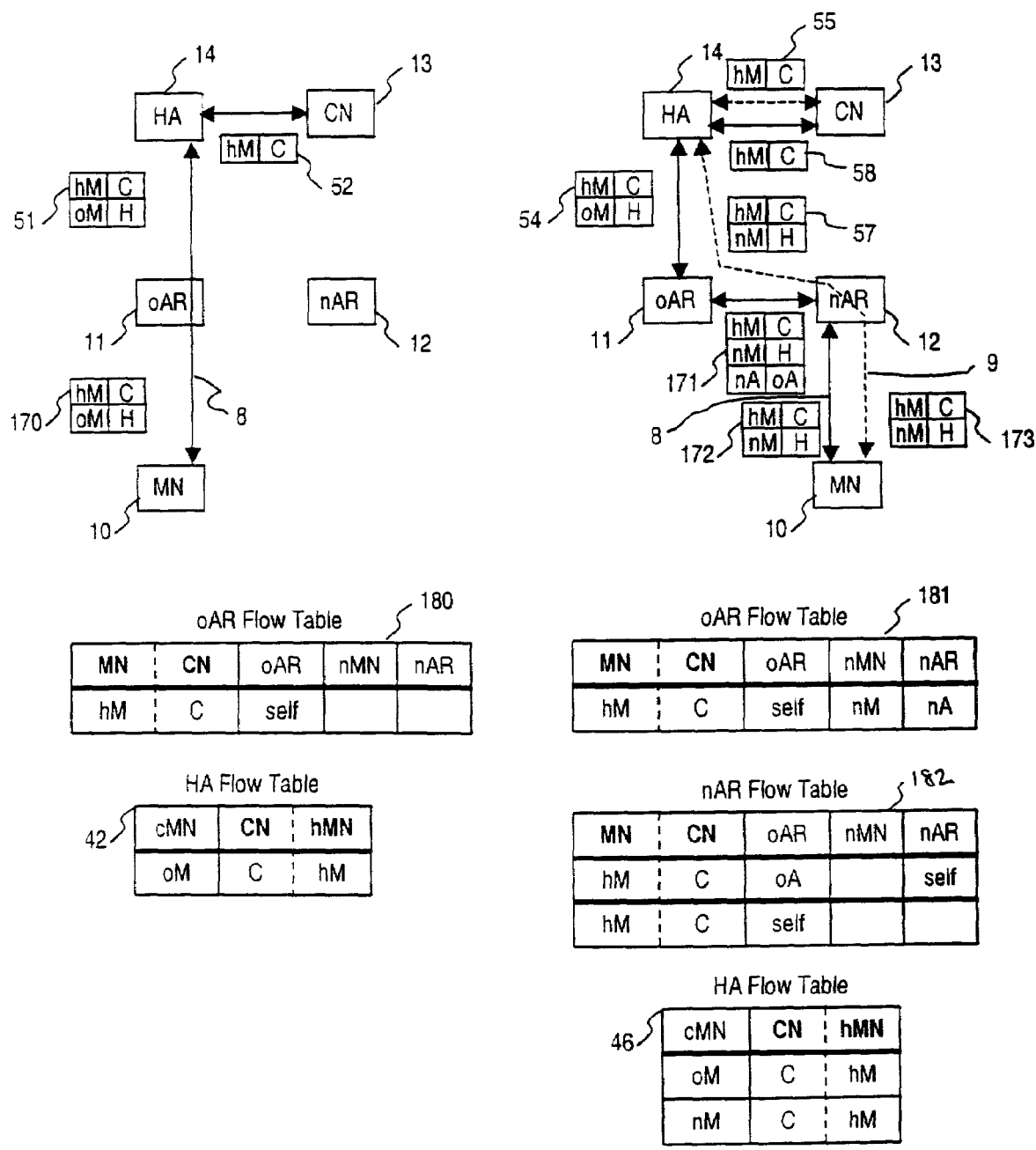
FIG. 14 illustrates one embodiment of a flow anchor with MN awareness of anchoring and utilization of a foreign agent CoA.

In an embodiment illustrated in FIG. 14, the MN is a "legacy" node unaware of flow anchoring, running MIP with a co-located CoA. The operation of the flow anchoring is similar to the operation described above with reference to FIG. 6. In this embodiment, however, the tunnel between the oAR 11 and the nAR 12 may encapsulate two IP-in-IP headers 171 instead of just one as in the packet 153 of FIG. 12. The MN 10 is unaware of the flow anchoring because the oAR 11 rewrites the MN 10's address in the outer MIP header between oM in the packet 54 and nM in the packet 171, which is conveyed to the oAR 11 along with the IP address of the current AR in the above-described messages between the ARs. Other details of the flow anchoring operations, including the operation of the HA 14, were described above and do not need further explanation.

Figure 15:
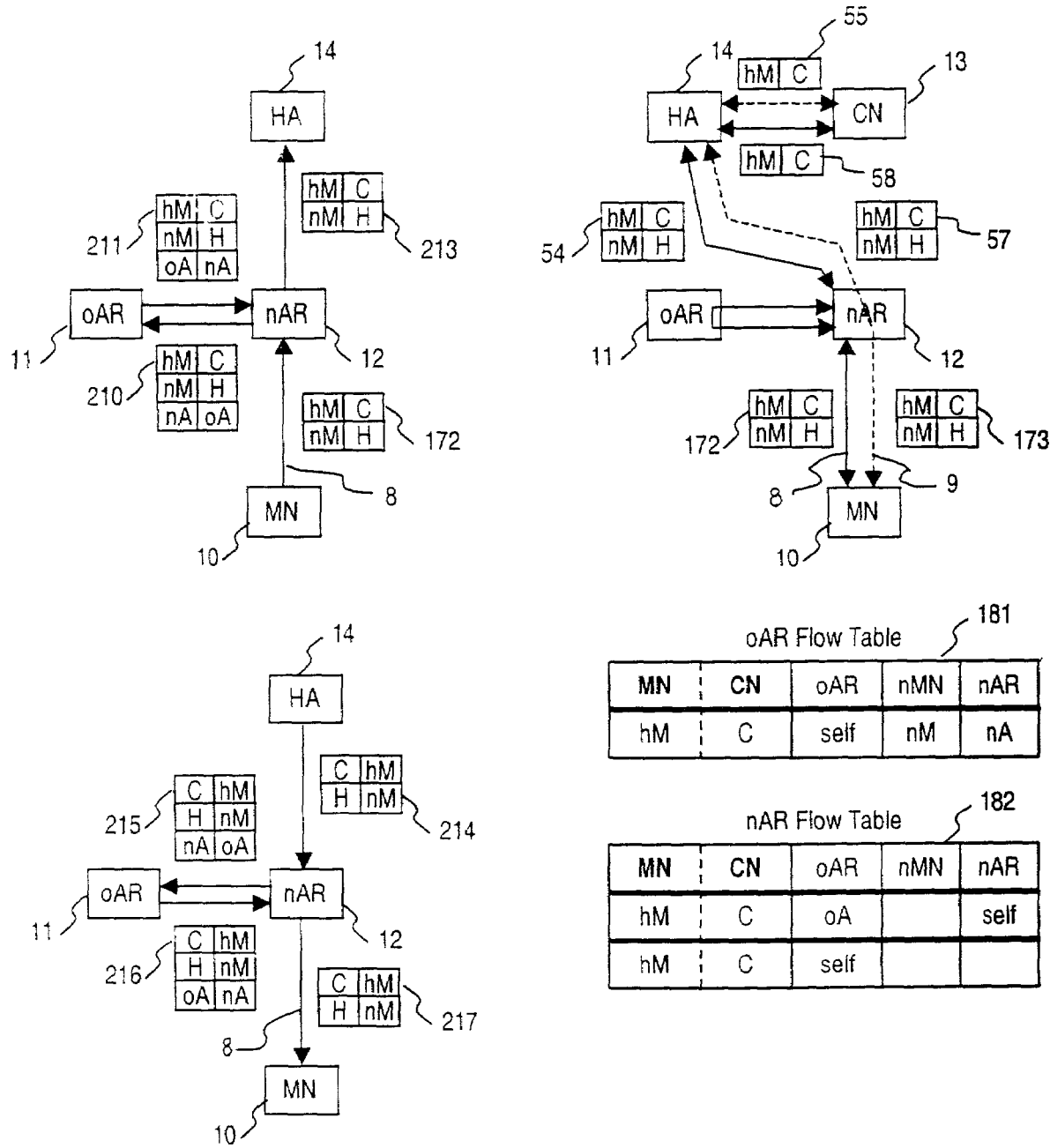
FIG. 15 illustrates one embodiment of a flow anchor with a Home Agent being a legacy node.

In one embodiment the MIP is utilized with fully transparent servers. In this embodiment the HA may need to keep a per-flow state. Alternatively, the per-flow state may be maintained in the AR instead of in the HA as illustrated in FIG. 15. In this embodiment the HA 14 does not keep per-flow state, and it sends and receives all packets for the MN 10 through the MN's current AR (nAR 12). In order for the packet to still traverse the original AR (oAR 11), all packets, according to an embodiment, travel from nAR 12 to the oAR 11 and back again. This operation is known as a u-turn.

In FIG. 15 the ARs 11 and 12, in one embodiment, are notified that HA is a legacy HA and that a u-turn may be required. The notification may be performed by a configuration server, for example a RADIUS server or other servers well known in the art. The position of source and destination addresses (C and hM) in FIG. 15 indicate the direction of packets for both ARs 11 and 12.

It will be appreciated that the MNs and HAs described above do not need to be operating in the same mode. The capabilities of the HA and MN may be known by the AR through a management system, or messages transferred between the MNs and HAs, or other methods and techniques well known in the art.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of anchoring an IP flow comprising:
   receiving the IP flow of a plurality of IP flows from a mobile node at an attached access router;
   transferring the IP flow from the attached access router to an original access router, the attached access router not diverting the IP flow through its attached server and the original access router maintaining a host table associated with the mobile node; and
   accessing a server attached to the original access router to service the IP flow, wherein the original access router is a router that the mobile node was attached to prior to the attached access router.

2. The method of claim 1 further comprising maintaining a flow table at the mobile node identifying the original access router for the IP flow.

3. The method of claim 1 wherein the host table identifies a current address of the mobile node.

4. The method of claim 1 wherein the receiving the IP flow further comprises identifying the original access router from a packet of the IP flow.

5. The method of claim 1 further comprising the mobile node notifying the original access router of a new address after changing a point of connection.

6. The method of claim 1 further comprising:
assigning an identifier to the mobile node;
inserting the identifier into the host table;
inserting the identifier into the IP flow; and
utilizing a tunneling protocol between the original access router and the attached access router to identify the mobile node.

7. The method of claim 1 further comprising the mobile node notifying the original access router of a termination of the IP flow.

8. The method of claim 7 further comprising the access router deleting entries in the host table relating to the terminated IP flow.

9. The method of claim 1 further comprising the access router deleting entries in the host table relating to the IP flow after a pre-determined period of inactivity.

10. The method of claim 1 wherein the server attached to the original access router is a partially transparent server.

11. The method of claim 1 wherein the server attached to the original access router is a non-transparent server.

12. The method of claim 1 wherein the server attached to the original access router is a fully transparent server.

13. The method of claim 1 wherein the server is running NAT.

14. The method of claim 1 wherein the original access router is running NAT.

15. The method of claim 1 further comprising forwarding the IP flow to a correspondent node.

16. The method of claim 1 further comprising utilizing a tunneling header to maintain packet sequencing.

17. The method of claim 1 further comprising:
forwarding the IP flow transmitted by a connecting node to the attached access router by a home agent;
forwarding the IP flow to the original access router by the attached access router; and
transmitting the IP flow to the attached access router by the original access router.

18. A method of anchoring an IP flow comprising:
receiving the IP flow of a plurality of IP flows from a mobile node at an attached access router;
forwarding the IP flow from the attached access router to an original access router;
transmitting the IP flow to a home agent associated with the mobile node, the home agent maintaining a flow table associated with the mobile node; and
forwarding the IP flow to a connecting node,
wherein the original access router is a router that the mobile node was attached to prior to the attached access router and wherein the original access router utilizes a configuration server to determine a home agent IP address and a mobile node IP address.

19. The method of claim 18 wherein the flow table contains an address of the original access router of the mobile node.

20. The method of claim 18 further comprising forwarding the IP flow to a care of address of the mobile node maintained in the flow table.

21. The method of claim 18 further comprising the mobile node notifying the home agent of a termination of the IP flow.

22. The method of claim 18 further comprising the home agent deleting entries in the flow table relating to the IP flow after a pre-determined period of inactivity.

23. The method of claim 18 wherein the mobile node is attached to the attached access node and the original access node simultaneously.

24. The method of claim 18 further comprising accessing a server attached to the original access node to service the IP flow.

25. The method of claim 24 wherein the server is a partially transparent server.

26. The method of claim 24 wherein the original access router relates an IP address of the server with the home agent via a static configuration.

27. The method of claim 24 wherein the original access router proxies a network on behalf of the home agent.

28. The method of claim 24 wherein the original access router proxies a network on behalf of the server.

29. The method of claim 18 wherein the original access router monitors networks messages for a home agent IP address and a mobile node IP address.

30. A method of anchoring IP flows comprising:
establishing a first flow table at an attached access router identifying an original access router for each IP flow of a plurality of IP flows;
receiving an IP flow of the plurality of IP flows at the attached access router from a mobile node;
determining the original access router for the IP flow; and
forwarding the IP flow from the attached access router to the original access router, the attached access router not diverting the IP flow through its attached server,
wherein the original access router is a router that the mobile node was attached to prior to the attached access router.

31. The method of claim 30 further comprising establishing a second flow table at the original access router identifying the attached access router for each IP flow of the plurality of IP flows.

32. The method of claim 30 further comprising the original access router transmitting entries associated with the IP flow in the second flow table to the attached access router upon the mobile node changing its point of connection to the attached access router.

33. The method of claim 31 further comprising the attached access router notifying the original access router of its address and the original access router storing the address in the second flow table.

34. The method of claim 30 further comprising accessing a server attached to the original access node to service the IP flow.

35. The method of claim 34 wherein the server is a partially transparent server.

36. The method of claim 30 further comprising transferring the IP flow to a connecting node.

37. The method of claim 30 wherein the original access router is running NAT.

38. A method of anchoring an IP flow comprising:
receiving the IP flow from a mobile node at an attached access router;
routing the IP flow from the attached access router to an original access router, the attached access router not diverting the IP flow through its attached server; and
diverting the IP flow through an original access router's attached server.

39. The method of claim 38 further comprising maintaining a flow table at the mobile node identifying the original access router for the IP flow.

40. The method of claim 38 wherein the receiving the IP flow further comprises identifying the original access router from a packet of the IP flow.

41. The method of claim 38 wherein the access router's attached server is a partially transparent server.

42. An apparatus for anchoring an IP flow comprising:
means for receiving the IP flow of a plurality of IP flows from a mobile node at an attached access router;
means for transferring the IP flow from the attached access router to an original access router, attached access router not diverting the IP flow through its attached server and the original access router maintaining a host table associated with the mobile node; and
means for accessing a server attached to the original access router to service the IP flow,
wherein the original access router is a router that the mobile node was attached to prior to the attached access router.

43. The apparatus of claim 42 further comprising:
means for transmitting the IP flow to a home agent associated with the mobile node, the home agent maintaining a flow table associated with the mobile node; and
means for forwarding the IP flow to a connecting node.

44. The apparatus of claim 42 further comprising:
means for establishing a flow table at the attached access router identifying the original access router for the IP flow;
means for determining the original access router for the IP flow.

45. An apparatus for anchoring an IP flow comprising:
a first access router configured to receive the IP flow of a plurality of IP flows from a mobile node, the mobile node being attached to the first access router;
a second access router configured to receive the IP flow from the first access router, the second access router further configured to maintain a host table associated with the mobile node; and
a server configured to service the IP flow, the server being attached to the second access router, wherein the first access router does not divert the IP flow through its attached server, and
wherein the second access router is a router that the mobile node was attached to prior to the first access router.

46. The apparatus of claim 45 further comprising a home agent configured to receive the IP flow from the original access router.

47. The apparatus of claim 46 further comprising a connecting node configured to receive the IP flow transmitted by the home agent.

48. The apparatus of claim 46 wherein the home agent is further configured to maintain a flow table associated with the mobile node.

49. The apparatus of claim 45 wherein the server is a partially transparent server.

* * * * *